US011984233B2

(12) United States Patent
Hwang et al.

(10) Patent No.: US 11,984,233 B2

(45) Date of Patent: May 14, 2024

(54) METHOD FOR DECOMMISSIONING HEAVY WATER REACTOR FACILITY

(71) Applicant: KOREA HYDRO & NUCLEAR POWER CO., LTD., Gyeongju-si (KR)

(72) Inventors: Seok-Ju Hwang, Daejeon (KR); Young Hwan Hwang, Daejeon (KR); Hang-Rae Cho, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 690 days.

(21) Appl. No.: 17/259,691

(22) PCT Filed: Jul. 3, 2019

(86) PCT No.: PCT/KR2019/008158

§ 371 (c)(1),
(2) Date: Jan. 12, 2021

(87) PCT Pub. No.: WO2020/013518

PCT Pub. Date: Jan. 16, 2020

(65) Prior Publication Data

US 2021/0319923 A1 Oct. 14, 2021

(30) Foreign Application Priority Data

Jul. 13, 2018 (KR) ........................ 10-2018-0081781

(51) Int. Cl.
*G21D 1/00* (2006.01)
*G21F 9/00* (2006.01)

(52) U.S. Cl.
CPC ............. *G21D 1/003* (2013.01); *G21F 9/008* (2013.01)

(58) Field of Classification Search
CPC ...................................................... G21D 1/003
See application file for complete search history.

(56) References Cited

U.S. PATENT DOCUMENTS 3,158,544 A * 11/1964 Jerkins ................... G21C 19/02 376/269
2021/0210236 A1* 7/2021 Hyun ..................... G21C 19/32

FOREIGN PATENT DOCUMENTS

| | | | | |
|---|---|---|---|---|
| CA | 2727492 A1 * | 7/2012 | G21C 17/017 |
| CA | 3066098 A1 * | 12/2018 | G21C 1/20 |
| FR | 2743445 A1 * | 7/1997 | G21C 19/34 |
| GB | 2520672 A * | 6/2015 | B26F 1/02 |
| JP | 2004-212149 | 7/2004 | |
| JP | 2005-291710 | 10/2005 | |
| JP | 4167198 B2 * | 10/2008 | |
| JP | 4256349 | 4/2009 | |

(Continued)

*Primary Examiner* — Lily C Garner

(74) *Attorney, Agent, or Firm* — LEX IP MEISTER, PLLC

(57) ABSTRACT

A method for decommissioning a heavy water reactor facility includes: removing the plurality of guide tubes from a plurality of through-holes; installing a plurality of shielding stoppers in the plurality of through-holes; removing the shielding stopper installed in one through-hole of the plurality of through-holes, and inserting a cutting device into a lower portion of the reactivity mechanism deck through the one through-hole to cut a connection portion between the reactivity mechanism deck and the calandria vault by using the cutting device; and separating the reactivity mechanism deck from the calandria vault.

6 Claims, 9 Drawing Sheets

1000

(56) References Cited

FOREIGN PATENT DOCUMENTS

| | | |
|---|---|---|
| KR | 10-2012-0082831 | 7/2012 |
| KR | 10-2014-0042009 | 4/2014 |
| KR | 10-1776102 | 9/2017 |

* cited by examiner

METHOD FOR DECOMMISSIONING HEAVY WATER REACTOR FACILITY

TECHNICAL FIELD

The present disclosure relates to a method for decommissioning a heavy water reactor facility.

BACKGROUND ART

Generally, a heavy water reactor facility including a calandria among nuclear facilities used for nuclear power generation further includes a calandria vault for accommodating the calandria, and a reactivity mechanism deck supported by the calandria vault to be positioned at an upper portion of the calandria.

When decommissioning the heavy water reactor, it is necessary to separate the reactivity mechanism deck positioned at the upper portion of the calandria from the calandria vault in order to easily separate the calandria from the calandria vault.

DISCLOSURE

Technical Problem

An embodiment is to provide a method for decommissioning a heavy water reactor facility that easily separates a reactivity mechanism deck from a calandria vault.

Technical Solution

An embodiment provides a method for decommissioning a heavy water reactor facility that includes a calandria, a calandria vault accommodating the calandria, a reactivity mechanism deck supported by the calandria vault to be located at an upper portion of the calandria and including a plurality of through-holes, and a plurality of guide tubes connected to the calandria through the plurality of through-holes, including: removing the plurality of guide tubes from the plurality of through-holes; installing a plurality of shielding stoppers in the plurality of through-holes; removing a shielding stopper installed in one through-hole of the plurality of through-holes, and inserting a cutting device into a lower portion of the reactivity mechanism deck through the one through-hole to cut a connection portion between the reactivity mechanism deck and the calandria vault by using the cutting device; and separating the reactivity mechanism deck from the calandria vault.

The cutting of the connection portion between the reactivity mechanism deck and the calandria vault by using the cutting device may include installing one shielding ring between the one through-hole and the cutting device.

The cutting of the connection portion between the reactivity mechanism deck and the calandria vault by using the cutting device may be performed by cutting a seal plate welded between a liner plate positioned on an inner wall of the calandria vault and the reactivity mechanism deck.

The heavy water reactor facility may further include a seismic restraint positioned between the reactivity mechanism deck and the calandria and connected to the liner plate of the calandria vault, and the method for decommissioning the heavy water reactor facility may further include separating the seismic restraint from the liner plate by using the cutting device.

The method for decommissioning the heavy water reactor facility may further include removing a shielding stopper installed in another through-hole among the plurality of through-holes, and inserting a camera device into a lower portion of the reactivity mechanism deck through the other through-hole to check a lower space of the reactivity mechanism deck by using the camera device.

The checking of the lower space of the reactivity mechanism device by using the camera device may include installing another shielding ring between the other through-hole and the camera device.

The separating of the reactivity mechanism deck from the calandria vault may include: lifting the reactivity mechanism deck from the calandria vault by using a crane; installing a platform on an upper portion of the calandria vault; installing a carrier roller on an upper portion of the platform; and mounting the reactivity mechanism deck on the carrier roller to move it.

Advantageous Effects

According to the embodiment, a method for decommissioning a heavy water reactor facility that easily separates a reactivity mechanism deck from a calandria vault is provided.

MODE FOR INVENTION

The present invention will be described more fully hereinafter with reference to the accompanying drawings, in which embodiments of the invention are shown. As those skilled in the art would realize, the described embodiment may be modified in various different ways, all without departing from the spirit or scope of the present embodiment.

In addition, unless explicitly described to the contrary, the word "comprise" and variations such as "comprises" or "comprising" will be understood to imply the inclusion of stated elements but not the exclusion of any other elements.

Hereinafter, a method for decommissioning a heavy water reactor facility according to an embodiment will be described with reference to FIG. 1 to FIG. 9.

Hereinafter, a CANDU type of heavy water reactor facility including a calandria is exemplarily described as a heavy water reactor facility, but the heavy water reactor facility is not limited thereto.

Figure 1:
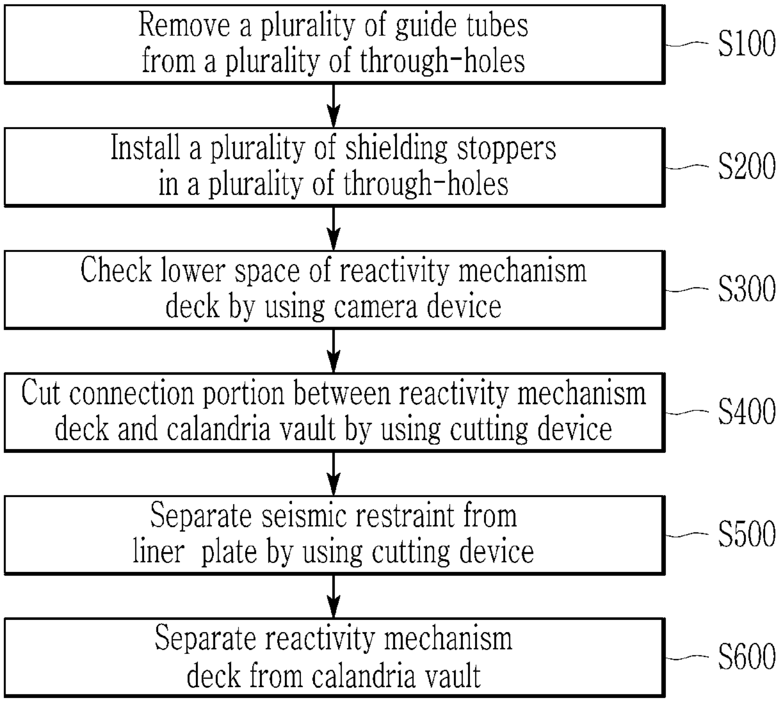
FIG. 1 illustrates a flowchart of a method for decommissioning a heavy water reactor facility according to an embodiment.

FIG. 1 illustrates a flowchart of a method for decommissioning a heavy water reactor facility according to an embodiment.

FIG. 2 to FIG. 9 are drawings for explaining a method for decommissioning a heavy water reactor facility according to an embodiment.

Figure 2:
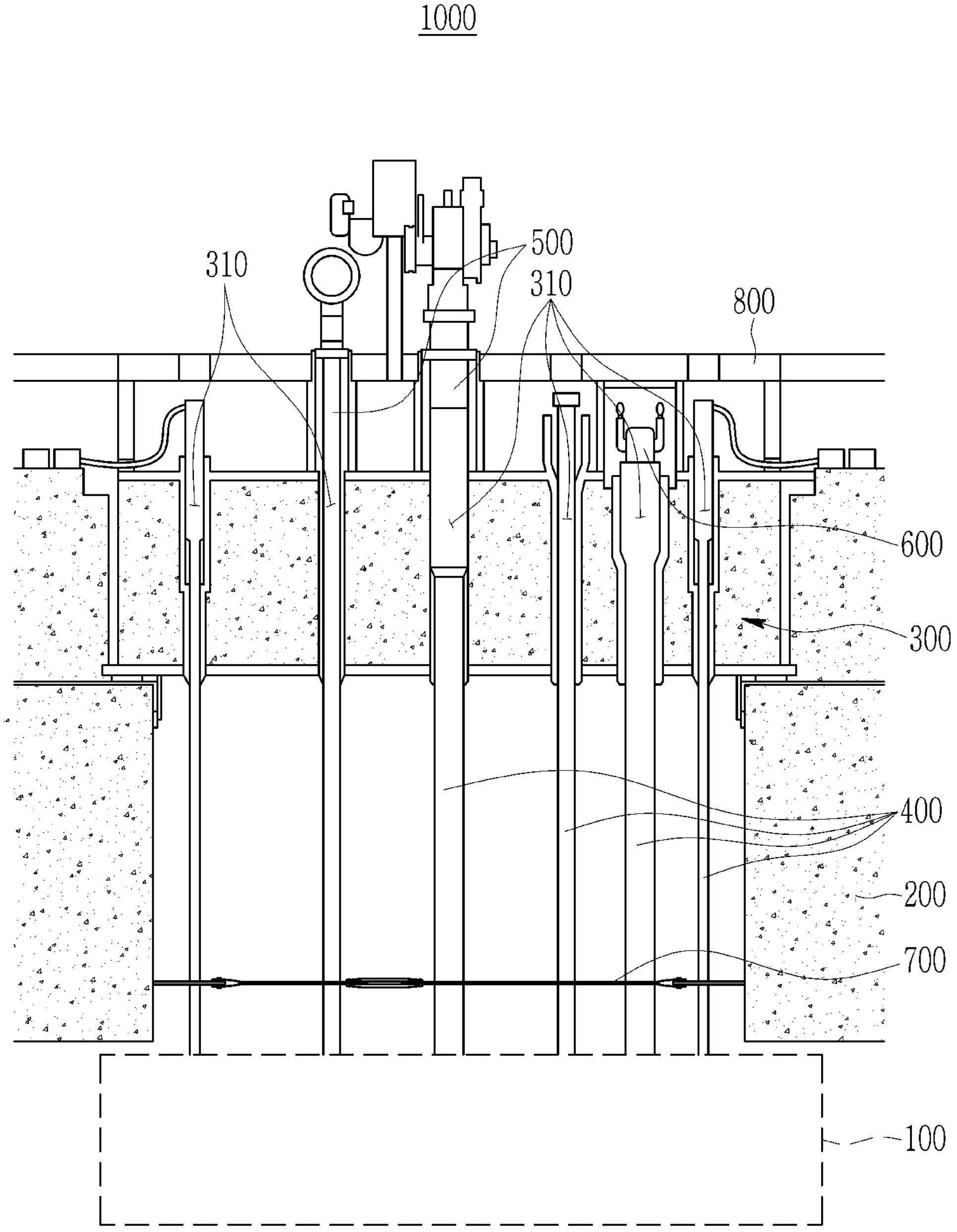
FIG. 2 to FIG. 9 are drawings for explaining a method for decommissioning a heavy water reactor facility according to an embodiment.

FIG. 2 illustrates a cross-sectional view of some of a heavy water reactor facility.

First, referring to FIG. 1 and FIG. 2, a plurality of guide tubes 400 are removed from a plurality of through-holes 310 (S100).

Specifically, referring to FIG. 2, a heavy water reactor facility 1000 includes a calandria 100, a calandria vault 200 for accommodating the calandria 100, a reactivity mechanism deck 300 that is supported by the calandria vault 200 and positioned at an upper portion of the calandria 100 and includes a plurality of through-holes 310, a plurality of guide tubes 400 connected to the calandria 100 through the plurality of through-holes 310, a control device 500 and a monitoring device 600 such as a control rod and an absorption rod that are supported by the reactivity mechanism deck 300 and inserted into the calandria 100 through the guide tube 400 passing through the through-hole 310, a seismic restraint 700 that is positioned between the reactivity mechanism deck 300 and the calandria 100 and supported by the calandria vault 200 to support the guide tube 400, and a tread plate 800 for covering the reactivity mechanism deck 300.

First, it is possible to minimize radiation exposure to a worker by decommissioning a pressure tube and a calandria tube that are connected to the calandria 100 from the calandria 100.

Next, the tread plate 800 installed on the upper portion of the reactivity mechanism deck 300 is removed, and then the control device 500 and the monitoring device 600 such as the control rod and the absorption rod supported on the reactivity mechanism deck 300 are drawn out from the guide tube 400.

Then, the plurality of guide tubes 400 are removed from the plurality of through-holes 310.

Figure 3:
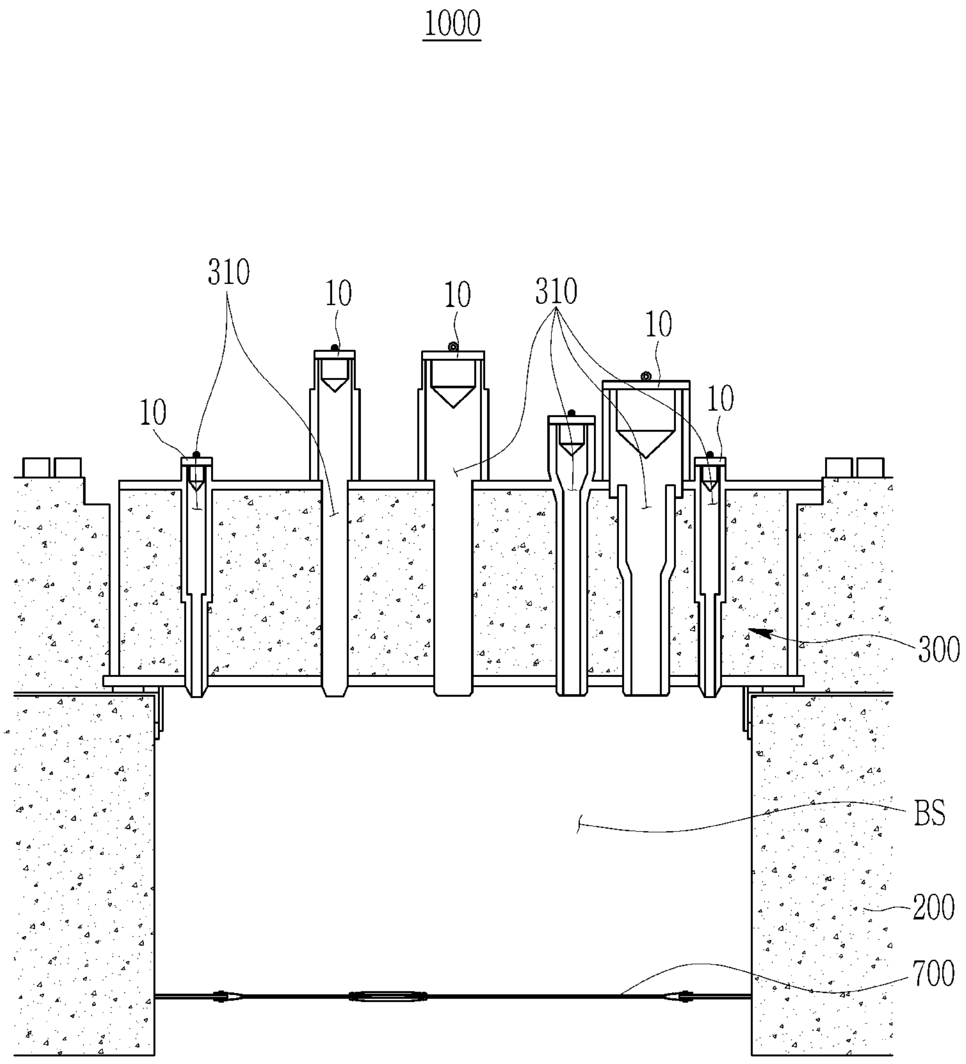

FIG. 3 illustrates a cross-sectional view of some of the heavy water reactor facility from which the guide tubes are removed. In FIG. 3, the calandria is not shown.

Next, referring to FIG. 3, a plurality of shielding stoppers 10 are installed in the plurality of through-holes 310 (S200).

Specifically, the plurality of shielding stoppers 10 are installed in the plurality of through-holes 310 in order to suppress leakage of radioactivity to the outside through the through-holes 310 from a lower space BS of the reactivity mechanism deck 300.

Figure 4:
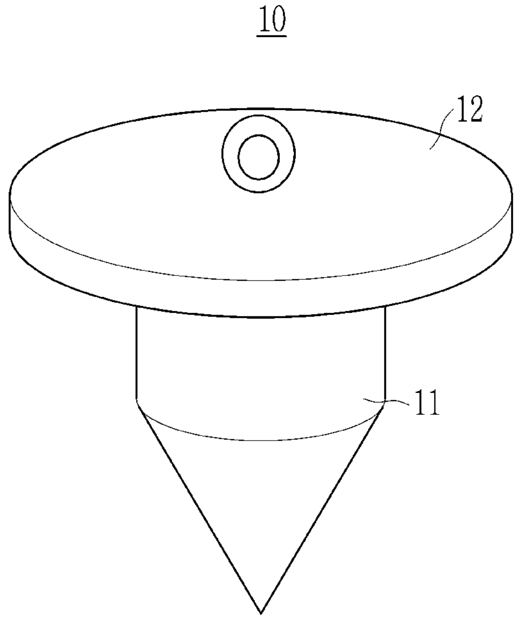

FIG. 4 illustrates a perspective view of the shielding stopper shown in FIG. 3.

Referring to FIG. 4, the shielding stopper 10 may include a weight 11 of a cone shape and a stopper 12 positioned on the weight 11, but may have various shapes as long as it may shield the through-hole 310.

Figure 5:
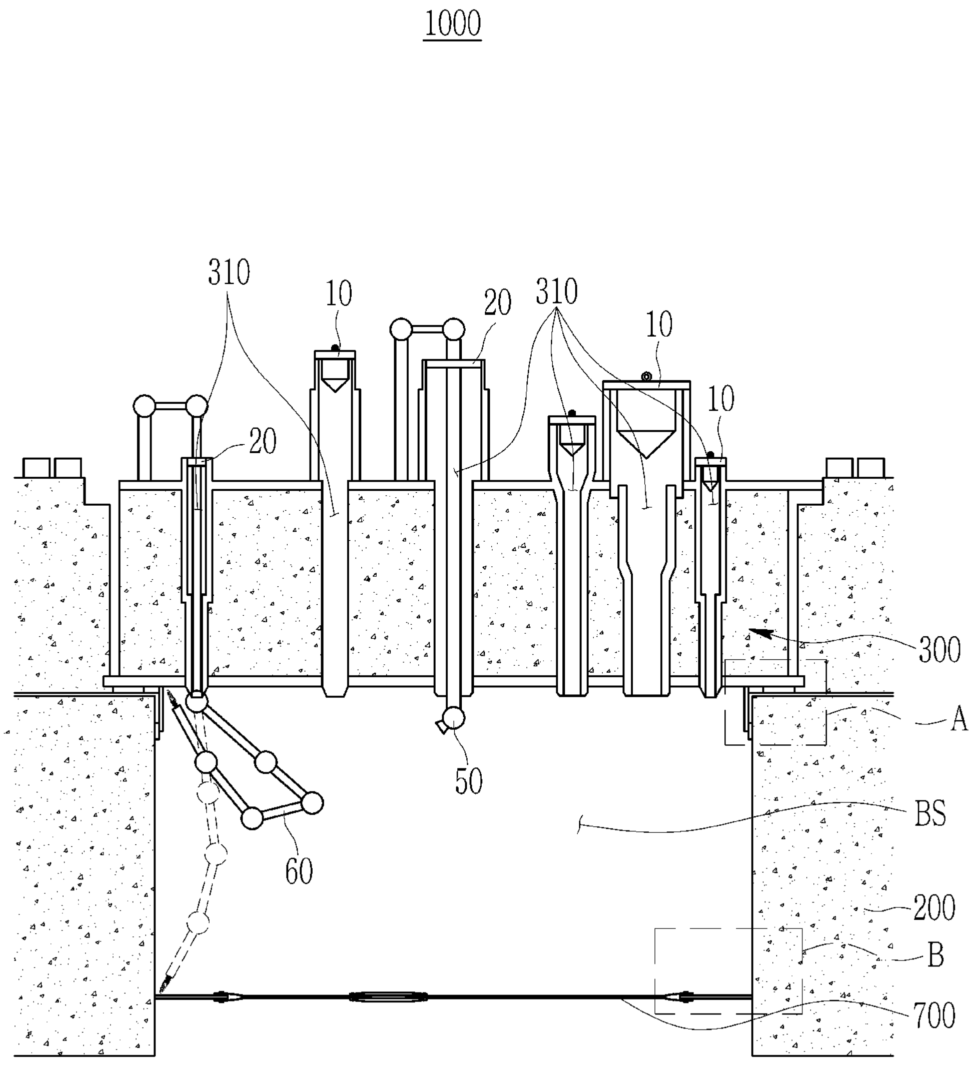

FIG. 5 is a cross-sectional view showing that a camera device and a cutting device are inserted into a lower portion of a reactivity mechanism deck through through-holes of a heavy water reactor facility.

Next, referring to FIG. 5, a lower space of the reactivity mechanism deck 300 is checked by using a camera device 50 (S300).

Specifically, the shielding stopper 10 installed in another through-hole 310 among the plurality of through-holes 310 of the reactivity mechanism deck 300 is removed, and the camera device 50 is inserted in the lower portion of the reactivity mechanism deck 300 through another through-hole 310 to check the lower space BS of the reactivity mechanism deck 300 by using the camera device 50. In this case, another shielding ring 20 is installed between another through-hole 310 and the camera device 50.

The camera device 50 may include an end effector including a manipulator and a radiation-resistant camera, but as long as it may check the lower space BS of the reactivity mechanism deck 300 through another through-hole 310, it may be known various types of cameras.

Figure 6:
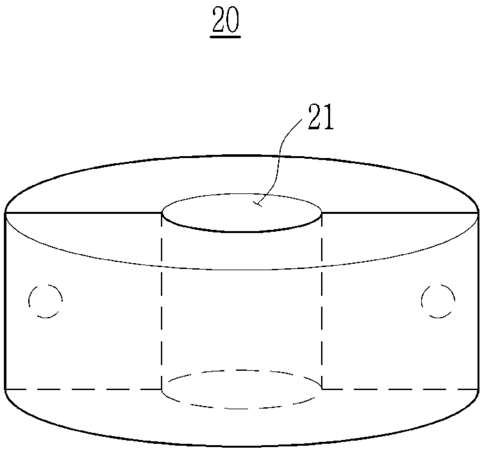

FIG. 6 illustrates a perspective view of the shielding ring shown in FIG. 5.

Referring to FIG. 6, the shielding ring 20 has a ring shape having an opening 21 formed in a middle thereof. The camera device 50 and a cutting device 60 which will be described later are inserted through the opening 21. The opening 21 may have various sizes respectively corresponding to a width of the camera device 50 and a width of the cutting device 60.

Figure 7:
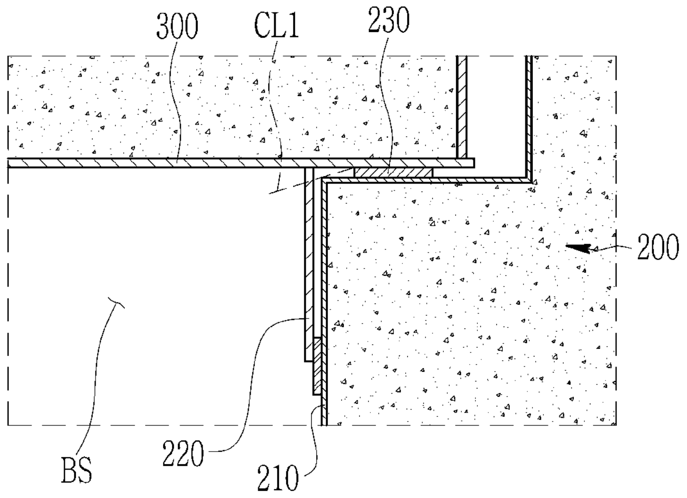

FIG. 7 illustrates a cross-sectional view of a portion "A" of FIG. 5.

Next, referring to FIG. 5 and FIG. 7, a connection portion between the reactivity mechanism deck 300 and the calandria vault 200 is cut by using the cutting device 60 (S400).

Specifically, referring to FIG. 5, the shielding stopper 10 installed in one through-hole 310 among the plurality of through-holes 310 is removed, and the cutting device 60 is inserted in the lower portion of the reactivity mechanism deck 300 through one through-hole 310 to cut the connection portion between the reactivity mechanism deck 300 and the calandria vault 200 by using the cutting device 60. In this case, another shielding ring 20 is installed between one through-hole 310 and the cutting device 60.

The cutting using the cutting device 60 may be performed by using an image of the lower space BS of the reactivity mechanism deck 300 checked by the above-described camera device.

Referring to FIG. 7, the process of cutting the connection portion between the reactivity mechanism deck 300 and the calandria vault 200 by using the cutting device 60 may be performed by cutting a seal plate 220 welded between a liner plate 210 located on an inner wall of bioshielding concrete of the calandria vault 200 and the reactivity mechanism deck 300 along a cutting line CL1.

The cutting device 60 may include an end effector including a multi-joint manipulator and a rotating saw or an oscillator for irradiating a laser beam, but as long as it may cut the seal plate 220 welded between the liner plate 210 and the reactivity mechanism deck 300 through one through-hole 310 along one cutting line CL1, it may be various known cutting devices.

The seal plate 220, which is the connection portion between the reactivity mechanism deck 300 and the calandria vault 200, is cut, so that the reactivity mechanism deck 300 supported on an upper part of the calandria vault 200 with a shim plate 230 therebetween may be easily separated from the calandria vault 200 by using a crane.

Meanwhile, a foaming resin such as grout and Styrofoam that may be filled between a side surface of the reactivity mechanism deck 300 and the calandria vault 200 may be removed by using mechanical methods such as hammering or drilling.

Figure 8:
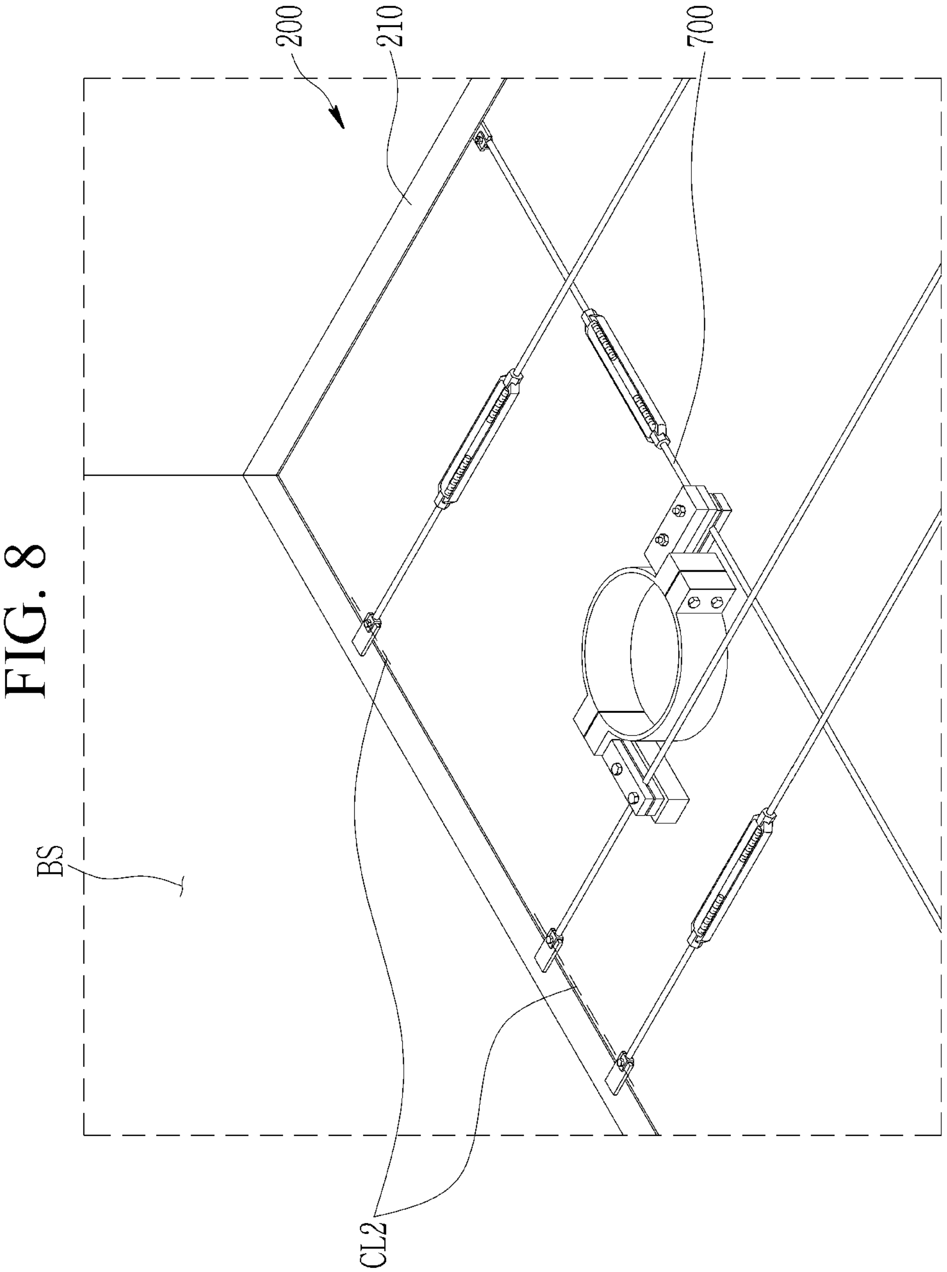

FIG. 8 illustrates a perspective view of a portion "B" of FIG. 5.

Next, referring to FIG. 5 and FIG. 8, the seismic restraint 700 is separated from the liner plate 210 of the calandria vault 200 by using the cutting device 60 (S500).

Specifically, referring to FIG. 5, the seismic restraint 700 supported by the calandria vault 200 is separated from the liner plate 210 by using the cutting device 60.

Referring to FIG. 8, the process of separating the seismic restraint 700 from the calandria vault 200 by using the cutting device 60 may be performed by cutting the seismic restraint 700 connected to the liner plate 210 positioned on the inner wall of the bio-shielding concrete along another cutting line CL2. A ring-shaped structure included in the seismic restraint 700 may be a structure supporting the guide tube, but is not limited thereto.

Figure 9:
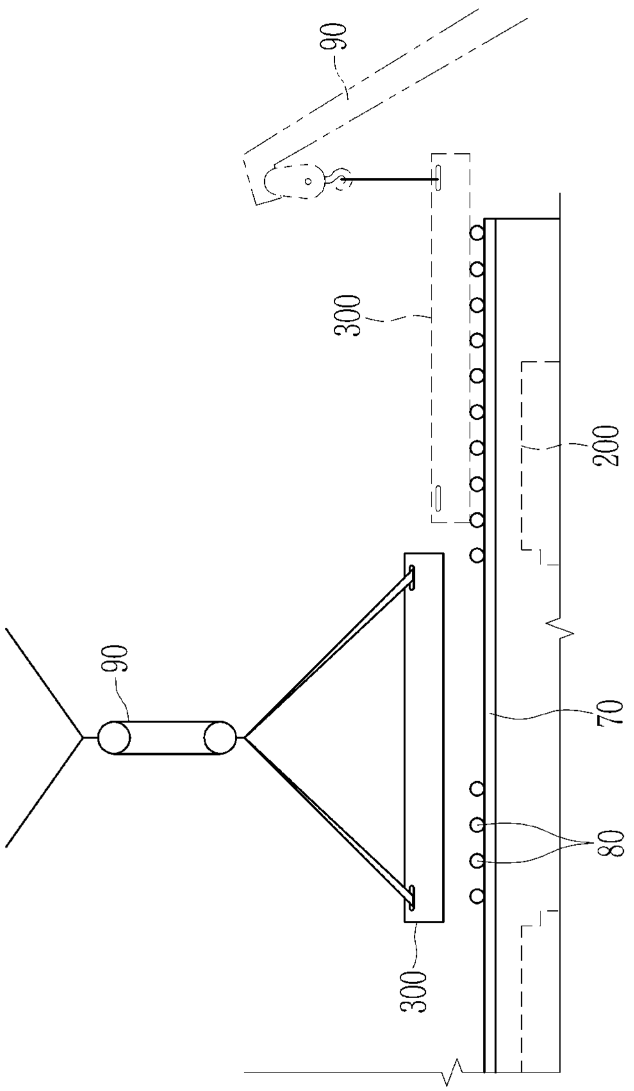

FIG. 9 is a cross-sectional view showing the separation of the reactivity mechanism deck from the calandria vault.

Next, referring to FIG. 9, the reactivity mechanism deck 300 is separated from the calandria vault 200 (S600).

Specifically, first, the reactivity mechanism deck 300 is lifted from the calandria vault 200 by using a crane 90.

Next, a platform 70 is installed on the upper portion of the calandria vault 200, and a carrier roller 80 is installed on the platform 70.

Next, the reactivity mechanism deck 300 is separated from the calandria vault 200 by mounting the reactivity mechanism deck 300 on the carrier roller 80 by using the crane 90 and then by moving it to a discharging passage.

Thereafter, it is possible to decommission the heavy water reactor facility by decommissioning and discharging the reactivity mechanism deck 300 from the calandria through a separated space and then by decommissioning the calandria vault 200.

As described above, according to the method for decommissioning the heavy water reactor facility according to the embodiment, the cutting device 60 is inserted into the lower space BS of the reactivity mechanism deck 300 through the through-holes 310 of the reactivity mechanism deck 300 to easily cut the connection portion between the calandria vault 200 and the reactivity mechanism deck 300, thereby easily separating the reaction system deck 300 from the calandria vault 200.

In addition, according to the method for decommissioning the heavy water reactor facility according to the embodiment, it is possible to easily secure a work space and an equipment entrance for decommissioning and demolishing the calandria, which is part of a nuclear reactor, by easily separating the reactivity mechanism deck 300 from the calandria vault 200.

In addition, according to the method for decommissioning the heavy water reactor facility according to the embodiment, it is possible to easily separate the seismic restraint 700 connected to the liner plate 210 of the calandria vault 200, by inserting the cutting device 60 into the lower space BS of the reactivity mechanism deck 300 through the through-holes 310 of the reactivity mechanism deck 300.

In addition, according to the method for decommissioning the heavy water reactor facility according to the embodiment, it is possible to suppress the worker's exposure to radiation, by using the shielding stopper 10 that shields the through-holes 310 and the shielding ring 20 that shields between the through-hole 310 and the cutting device 60 and between the through-hole 310 and the camera device 50.

In addition, according to the method for decommissioning the heavy water reactor facility according to the embodiment, it is possible to improve the stability of the bioshielding concrete structure of the calandria vault 200 during the decommissioning process of the heavy water reactor facility by easily separating the reactivity mechanism deck 300, which is a weight object supported by the calandria vault 200, from the calandria vault 200.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS calandria 100, calandria vault 200, reactivity mechanism deck 300, guide tube 400, shielding stopper 10, cutting device 60

The invention claimed is:

1. A method for decommissioning a heavy water reactor facility that includes a calandria, a calandria vault accommodating the calandria, a reactivity mechanism deck supported by the calandria vault to be located at an upper portion of the calandria and including a plurality of through-holes, and a plurality of guide tubes connected to the calandria through the plurality of through-holes, comprising:

removing the plurality of guide tubes from the plurality of through-holes;

installing a plurality of shielding stoppers in the plurality of through-holes;

removing the shielding stopper installed in a first through-hole of the plurality of through-holes;

inserting a cutting device into a lower portion of the reactivity mechanism deck through the first through-hole;

cutting a connection portion between the reactivity mechanism deck and the calandria vault by using the cutting device; and separating the reactivity mechanism deck from the calandria vault, wherein the cutting of the connection portion between the reactivity mechanism deck and the calandria vault by using the cutting device includes installing a first shielding ring between the first through-hole and the cutting device.

2. The method for decommissioning the heavy water reactor facility of claim 1, wherein the cutting of the connection portion between the reactivity mechanism deck and the calandria vault by using the cutting device is performed by cutting a seal plate welded between a liner plate positioned on an inner wall of the calandria vault and the reactivity mechanism deck.

3. The method for decommissioning the heavy water reactor facility of claim 2, wherein the heavy water reactor facility further includes a seismic restraint positioned between the reactivity mechanism deck and the calandria and connected to the liner plate of the calandria vault, and the method for decommissioning the heavy water reactor facility further includes separating the seismic restraint from the liner plate by using the cutting device.

4. The method for decommissioning the heavy water reactor facility of claim 1, further comprising:

removing a shielding stopper installed in a second through-hole among the plurality of through-holes;

inserting a camera device into a lower portion of the reactivity mechanism deck through the second through-hole; and checking a lower space of the reactivity mechanism deck by using the camera device.

5. The method for decommissioning the heavy water reactor facility of claim 4, wherein the checking of the lower space of the reactivity mechanism device by using the camera device includes installing a second shielding ring between the second through-hole and the camera device.

6. The method for decommissioning the heavy water reactor facility of claim 1, wherein the separating of the reactivity mechanism deck from the calandria vault includes:

lifting the reactivity mechanism deck from the calandria vault by using a crane;

installing a platform on an upper portion of the calandria vault;

installing a carrier roller on an upper portion of the platform; and mounting the reactivity mechanism deck on the carrier roller to move it.

* * * * *